Dec. 15, 1942.  J. W. JEWELL  2,304,827
TRANSFER OF SOLID MATERIAL BETWEEN ZONES OF DIFFERENT PRESSURES
Filed July 30, 1940
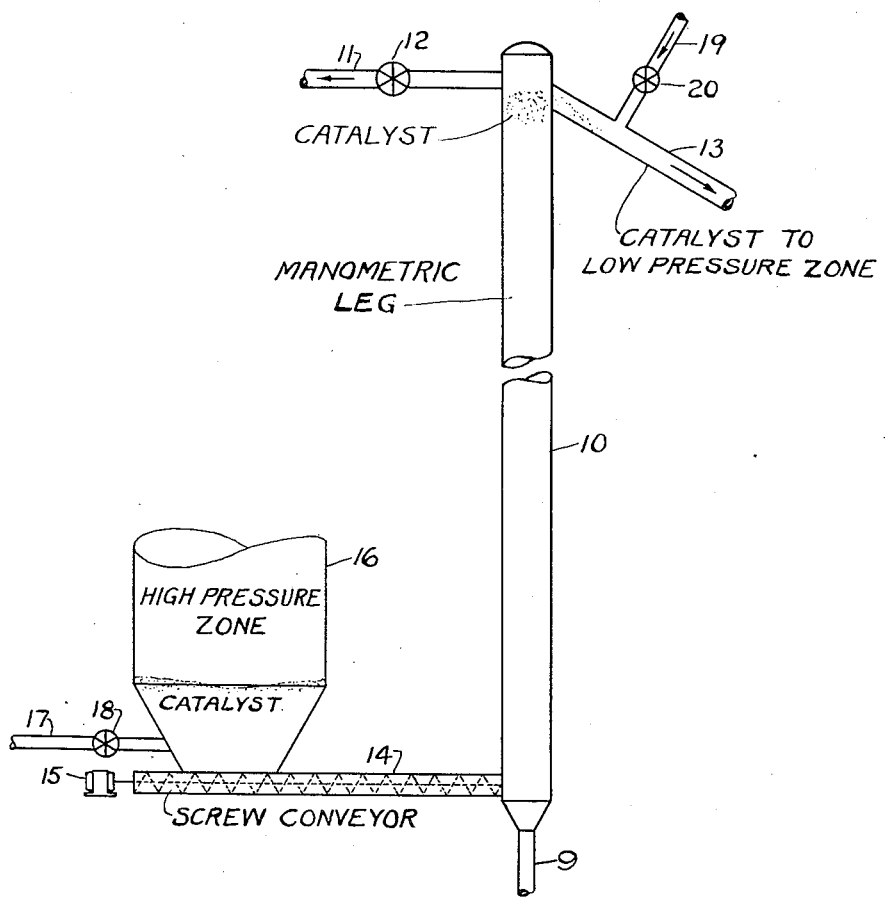
JOSEPH W. JEWELL.
INVENTOR
BY *C. L. Liebrecht*
ATTORNEY Patented Dec. 15, 1942

2,304,827

UNITED STATES PATENT OFFICE 2,304,827

TRANSFER OF SOLID MATERIAL BETWEEN ZONES OF DIFFERENT PRESSURES

Joseph W. Jewell, Summit, N. J., assignor to The M. W. Kellogg Company, Jersey City, N. J., a corporation of Delaware Application July 30, 1940, Serial No. 348,365

6 Claims. (Cl. 196—52)

This invention relates generally to the handling of solids, and more particularly to the transfer of subdivided solids between gas- or vapor-filled zones maintained at different pressures.

The main object of the invention is to provide an improved method and apparatus whereby pulverized or granulated solids may be transferred from a high pressure zone to a low pressure zone or vice versa. In general terms, the feature of the invention which renders possible the accomplishment of the foregoing and other objects is the establishment of a relatively elongated vertically extending conduit connecting with a low pressure zone at the top and with a high pressure zone at the bottom, and the maintenance therein of a column of subdivided solid material in an aerated condition, such that the solid material will behave as a fluid to the extent that it will exert a pseudo-hydrostatic head in opposition to the higher pressure. The invention contemplates transfer of aerated particles along such a manometric leg by simple displacement.

While the invention is of utility in handling many kinds of solids it is especially advantageous in handling catalytic materials. Recently there have been proposed a number of processes for the catalytic conversion of hydrocarbons wherein catalysts in particle form are continuously introduced into conversion zones through which hydrocarbon vapors are passing, and continuously withdrawn therefrom after they have acquired an inactivating deposit of carbonaceous material. The inactivated catalysts may then be passed directly to regeneration zones wherein their carbonaceous deposits are removed by combustion, leaving the catalysts in condition for reintroduction into the conversion zones. In processes of this type it is frequently desirable that a conversion zone and a regeneration zone be maintained at different pressures, and the problem of how to transfer a catalyst from one zone to the other and back again is encountered.

The continuous transfer of granular or powdered catalyst from a high to a low pressure zone by prior methods involving a throttling action has had the disadvantage of disrupting catalyst particles and producing fines because of the sudden expansion of gas enclosed within the pores thereof. Other difficulties, such as the tendency of a catalyst to erode valves through which it is throttled, have also been encountered. In contradistinction to the methods of the prior art, my invention avoids the aforementioned difficulties. My method does not involve any throttling action and can be used to reduce pressure on catalytic material so gradually that even relatively friable material does not suffer from expansion of enclosed gas.

The invention will now be described in detail with reference to the accompanying drawing which illustrates apparatus for the transfer of catalytic material from a high to a low pressure zone.

My invention will be described in connection with the transfer of catalyst from a high pressure to a low pressure zone, although it may be used to transfer catalyst from a low pressure to a high pressure zone. A manometric leg 10 is provided with an outlet 11 controlled by valve 12 for aerating gas which is present with the catalyst in the leg 10. The downwardly sloping conduit 13 communicates with the upper portion of the leg for the withdrawal of catalyst therefrom into a low pressure conversion zone and a screw conveyor 14 driven by motor 15 takes catalyst in aerated condition from a hopper 16 and introduces it into the base of the manometric leg from a high pressure regeneration zone.

My invention will be described in connection with the transfer of catalyst from a regeneration zone maintained at a pressure of about 20 pounds gauge to a conversion zone maintained at a pressure of about 5 pounds gauge although it may be used in the transfer from the conversion zone to the higher pressure regeneration zone. The catalyst to be transferred is a granular or finely divided material of approximately 100 mesh and has a bulk density of about 30 lbs./cu. ft. when in an aerated condition. Obviously, different size catalyst particles, for example, 100 to 400 mesh, may be used in practicing this invention. It is preferable to maintain the catalyst at the highest bulk density at which it will flow as a fluid in order to keep to a minimum the height of the leg 10.

The arrangement of apparatus shown by the drawing is suitable for this pressure reduction and in such a case I preferably make the height of the catalyst column equal to or slightly more than that required to balance the 15 lb. pressure differential. The leg 10 is filled with aerated catalyst. Because of the greater possibility of unconsumed oxygen in flue gas entering the low pressure conversion zone and producing explosion hazards, I prefer to employ steam as the aerating gas in this embodiment of the invention.

Aerating gas, which also serves to strip oxygen from the regenerated catalyst in high pressure zone 16, is introduced through line 17 controlled by valve 18 until the catalyst reaches an aerated condition in which it has many of the properties of a fluid or "pseudo-liquid," presumably because the individual particles are separated by thin films of the aerating gas. Additional aerating gas is introduced through line 9 into the base of column 10 to insure the desired degree of aeration of the catalyst column. The column of catalyst will exert what may be referred to as a pseudo-hydrostatic pressure on the bottom of the manometric leg which will in pounds per square inch be approximately equal to the height of the catalyst column in feet multiplied by the average bulk density of the catalyst in pounds per cubic foot and divided by 144. Under the conditions of the example I prefer to employ an aerated catalyst column in the manometric leg 10 about 72 feet high. The pseudo-hydrostatic head will then be $72 \times {}^{30}/_{144}$=approximately fifteen pounds per square inch at the bottom of the column. This pressure head balances the pressure in the high pressure zone and thus eliminates any necessity for pressure reduction valves and keeps to the minimum any work to be done by a solids pump or screw conveyor. In the event it is desirable to operate at a slightly higher pressure at the base of leg 10, for control purposes, a compression pump may be used instead of the screw conveyor in which case additional aeration of the discharge of the pump may be desirable.

A catalyst which has been regenerated and collected in the hopper 16 under high pressure is withdrawn in aerated condition by screw conveyor 14 and introduced into the base of the manometric leg. As catalyst is introduced into the base of the manometric leg, equivalent quantities are displaced at the top of the column and fall into the downwardly sloping conduit 13 whence they pass to a conversion zone for reuse without any further reduction in pressure. A suitable method whereby the displaced catalyst may be conveyed to any desired point via line 13 is afforded by the provision of line 19 controlled by valve 20 through which a suitable carrying gas may be injected for moving the displaced catalyst through line 13 in suspension. Aerating gas is withdrawn through line 11 controlled by valve 12, although if the carrying gas is introduced through line 19 the aerating gas may well be allowed to mingle therewith and pass off in the same direction as the suspended catalyst.

The quantity of aerating gas which must be available in practicing my invention is in all cases relatively small, and depends upon numerous operating variables such as the rate at which solids are to be transferred and the size of the particles into which the solids are subdivided. It may readily be ascertained in any given case by trial. I have succeeded in maintaining material containing particles ranging from finer than 400 mesh up to larger than 20 mesh in an aerated condition without difficulty.

While I have shown and described one embodiment of my invention this is illustrative only and in no way limits the scope of my invention. My invention is limited solely by and in the following claims, in which I wish to claim all novel features inherent therein.

I claim:

1. In a process for the catalytic conversion of hydrocarbons of the type wherein subdivided solid catalytic material is alternately and continuously passed through a conversion zone wherein it acquires an inactivating carbonaceous deposit and a regeneration zone wherein said carbonaceous deposit is removed, said conversion zone and said regeneration zone containing gaseous materials under different pressures, the method of transferring catalytic material between said zones which comprises introducing the particles of solid catalytic material from one of said zones into one end of a manometric column of aerated catalytic particles in a pseudo-liquid condition opposing its pseudo hydrostatic pressure against the pressure of the higher pressure zone and withdrawing particles of catalytic material from the other end of said column into the other of said zones.

2. In a process for the catalytic conversion of hydrocarbons wherein particles of solid catalytic material are alternately and continuously passed through a conversion zone wherein they acquire an inactivating carbonaceous deposit and a regeneration zone wherein said carbonaceous deposit is removed and wherein said regeneration zone contains gaseous materials under a superatmospheric pressure substantially greater than the pressure of the gaseous material contained in said conversion zone, the method of transferring regenerated catalytic particles from said high pressure regeneration zone to said low pressure conversion zone which comprises introducing the particles of solid catalytic material from the regeneration zone into the lower end of a manometric column of aerated catalytic particles in a pseudo-liquid phase opposing its pseudo-hydrostatic pressure against the pressure of said higher pressure regeneration zone and withdrawing particles of catalytic material from the upper end of said column into the conversion zone, said column being of a height adapted to balance the pressure differential between said zones.

3. A process as defined in claim 2 wherein the pressure maintained in the regeneration zone is at least twice atmospheric pressure.

4. In a process for the catalytic conversion of hydrocarbons of the type wherein subdivided solid catalytic material is alternately and continuously passed through a conversion zone wherein it acquires an inactivating carbonaceous deposit and a regeneration zone wherein said carbonaceous deposit is removed, said conversion zone and said regeneration zone containing gaseous material under different pressures, the method of transferring catalytic material between said zones which comprises introducing the particles of solid catalytic material from one of said zones into one end of a manometric column of aerated catalytic particles in a pseudo-liquid phase opposing its pseudo-hydrostatic pressure against the pressure of the higher pressure zone and withdrawing particles of catalytic material from the other end of said column into the other of said zones, said column being of a suitable height to prevent the intermingling of the gases contained in said conversion zone and regeneration zones by passage through said column during the transfer of the catalytic particles therethrough.

5. In a process for the catalytic conversion of hydrocarbons wherein particles of solid catalytic material are alternately and continuously passed through a conversion zone wherein they acquire an inactivating carbonaceous deposit and a regeneration zone wherein said carbonaceous deposit is removed, said conversion zone and said regeneration zone containing gaseous materials under different pressures, the method of transferring the particles of catalytic material between said zones which comprises maintaining a vertically extending manometric column of the particles in communication with the zone of higher pressure at its lower end and in communication with the zone of lower pressure at its upper end, introducing an aerating gas into said column of solid particles in amount adapted to maintain the particles in a pseudo-liquid phase, the height of said column being such that it will exert a pseudo-hydrostatic pressure approximating the difference between the pressures of the two zones, and introducing the particles of solid catalytic material from one of said zones into said column at the end in communication therewith to displace solid material from the other end of said column into the other of said zones.

6. A method of transferring finely divided particles of solid catalytic material in a catalytic system between confined zones maintained under different gaseous pressures which comprises maintaining a vertically extending manometric column of the particles in communication with the zone of higher pressure at its lower end and in communication with the zone of lower pressure at its upper end, introducing an aerating gas into said column of solid particles in amount adapted to maintain the particles in a pseudo-liquid phase, the height of said column being such that it will exert a pseudo-hydrostatic pressure approximating the difference between the pressures of the two zones, and introducing the particles of solid catalytic material from one of said zones into said column at the end in communication therewith to displace solid material from the other end of said column into the other of said zones.

JOSEPH W. JEWELL.

Disclaimer 2,304,827.—*Joseph W. Jewell*, Summit, N. J. TRANSFER OF SOLID MATERIAL BETWEEN ZONES OF DIFFERENT PRESSURES. Patent dated Dec. 15, 1942. Disclaimer filed Dec. 18, 1947, by the assignee, *The M. W. Kellogg Company*.

Hereby enters this disclaimer to claims 1, 4, 5, and 6 of said patent, except with respect to those operations wherein the particles of catalytic material are introduced from the zone of higher pressure into the manometric column.

[*Official Gazette February 17, 1948.*]